United States Patent [19]

Housey et al.

[11] Patent Number: 5,526,337
[45] Date of Patent: Jun. 11, 1996

[54] HOLOGRAPHIC STORAGE MEDIA PACKAGE

[75] Inventors: Randal Housey; Vincent D. McCarty, both of Austin; Dan Swindler, Round Rock; Lindsay Gupton; Duane S. Dewald, both of Austin, all of Tex.

[73] Assignee: Tamarack Storage Devices, Austin, Tex.

[21] Appl. No.: 269,374

[22] Filed: Jun. 30, 1994

[51] Int. Cl.$^6$ ..................................................... G11B 7/00
[52] U.S. Cl. ........................... 369/103; 369/262; 369/291; 360/133
[58] Field of Search ................................... 369/290, 103, 369/262, 263, 264, 265, 266, 280, 281, 283, 289, 270, 271, 291; 360/132, 133

[56] References Cited

U.S. PATENT DOCUMENTS

| | | | |
|---|---|---|---|
| 4,503,530 | 3/1985 | Hinlein et al. | 369/270 |
| 5,091,814 | 2/1992 | Ikebe et al. | 360/133 |
| 5,103,363 | 4/1992 | Yamada et al. | 360/133 |
| 5,111,446 | 5/1992 | Fujita | 360/133 |
| 5,214,555 | 3/1993 | Hughes | 360/133 |
| 5,272,693 | 12/1993 | Fujisawa | 369/291 |
| 5,299,186 | 3/1994 | Tsurushima | 360/133 |
| 5,323,382 | 6/1994 | Takahashi | 369/291 |
| 5,326,608 | 7/1994 | Ikebe et al. | 360/133 |

*Primary Examiner*—Loha Ben
*Attorney, Agent, or Firm*—Gregory M. Howison

[57] ABSTRACT

A package for a holographic storage media disk (10) is provided that is comprised of a super structure (18) that is operable to hold the disk (10). The disk (10) is comprised of a photopolymer material that is formed in a disk-shaped member having a hub (14) disposed at the center thereof. The disk (10) is disposed in the structure (18) and then a cover (24) disposed thereover, the cover (24) being opaque. An access opening (28) is disposed within the cover (24) to allow access to the surface of the disk (10). A hub opening (26) is provided for allowing access to the hub (14). The hub (14) is disposed such that there is a light tight seal relative to the cover (24). A door (32) is provided for reciprocating over the opening (28) to light seal the package when data is not being recorded to the disk (10) or read therefrom. Additionally, layers of felt (161) and (163) are disposed on the interior surfaces of the cover to dampen any vibrations in the package, and a fiduciary marking opening (30) is provided for allowing access to fiduciary markings (164) disposed on the edge of the disk (10). The door (32) is operable to lock when in a portable mode and unlock when in an access mode.

11 Claims, 5 Drawing Sheets

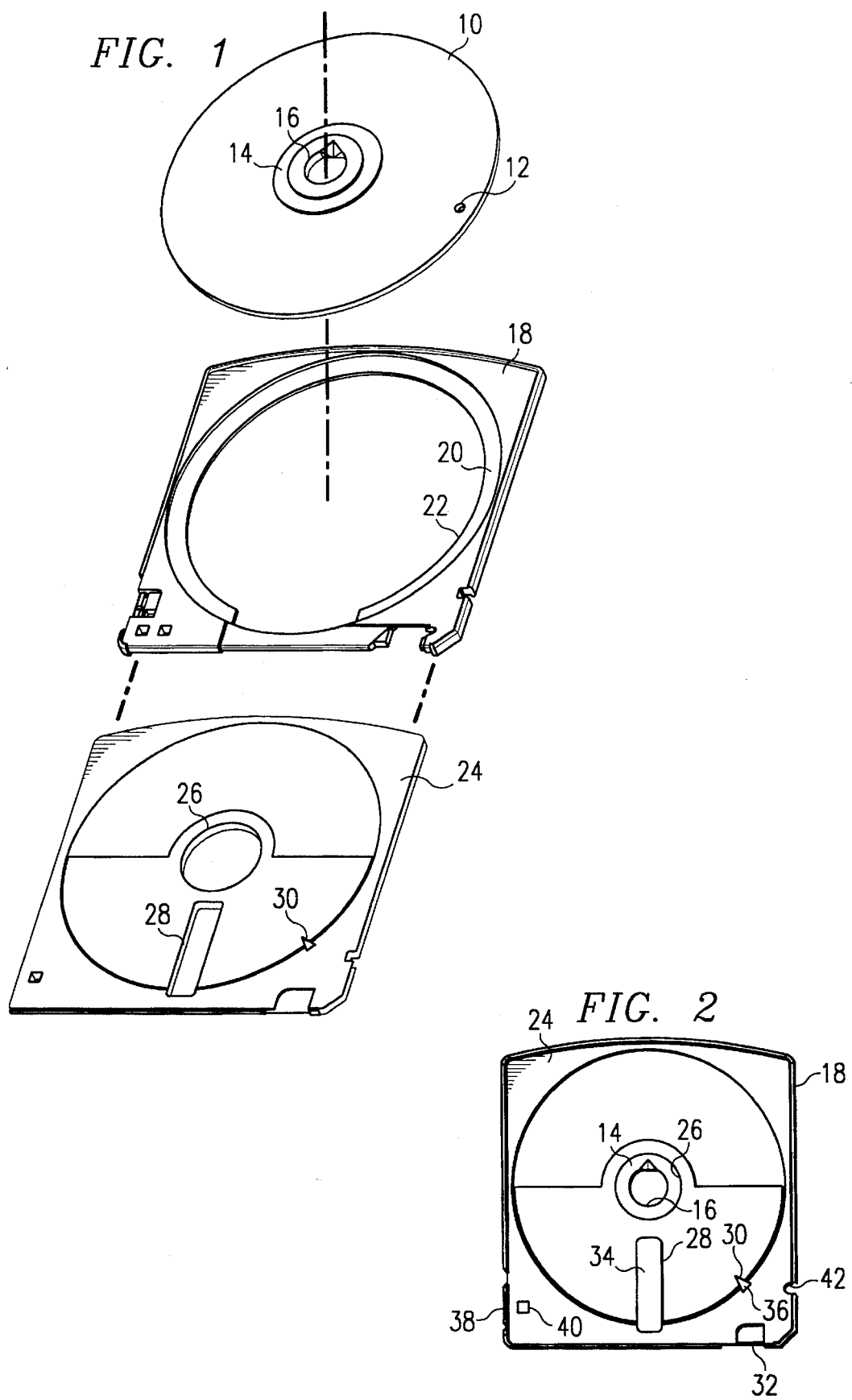

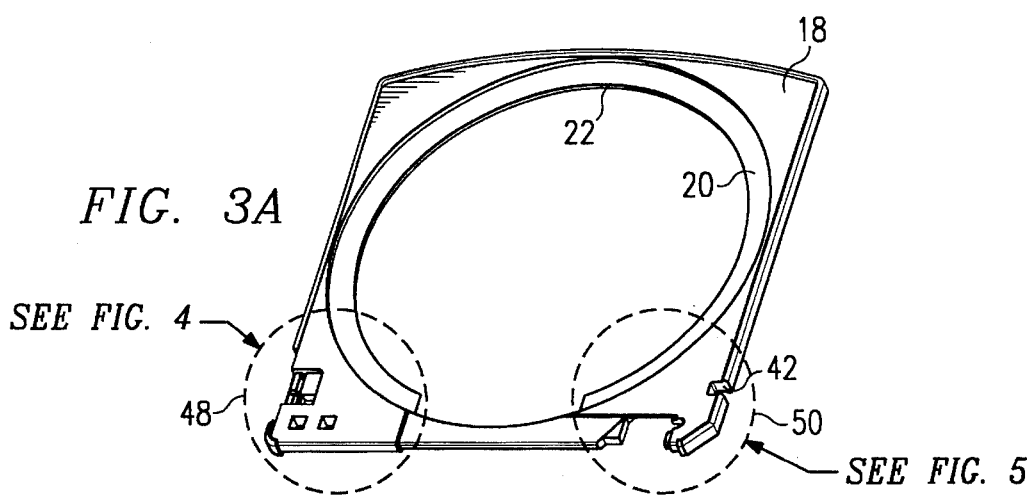
FIG. 3A
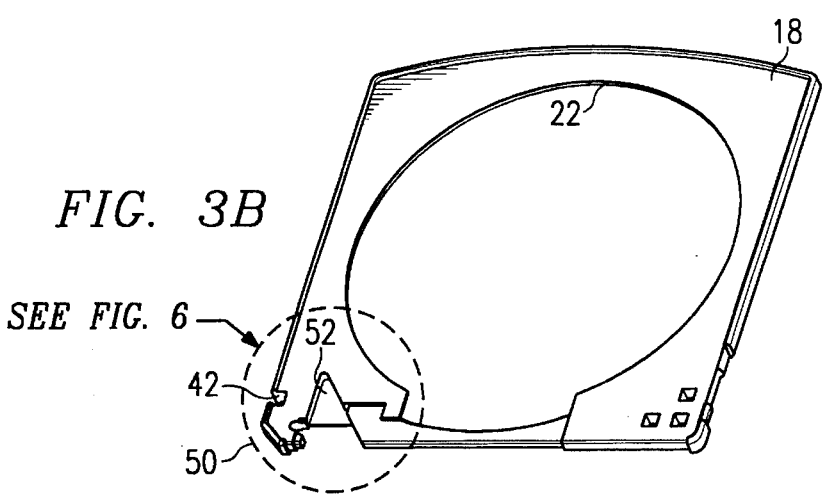
FIG. 3B
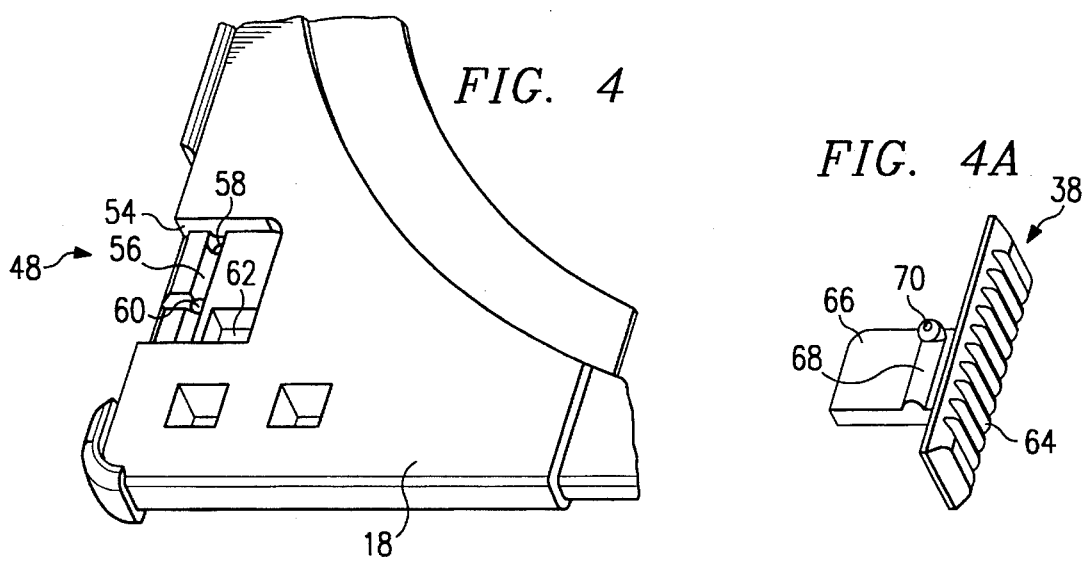
FIG. 4
FIG. 4A

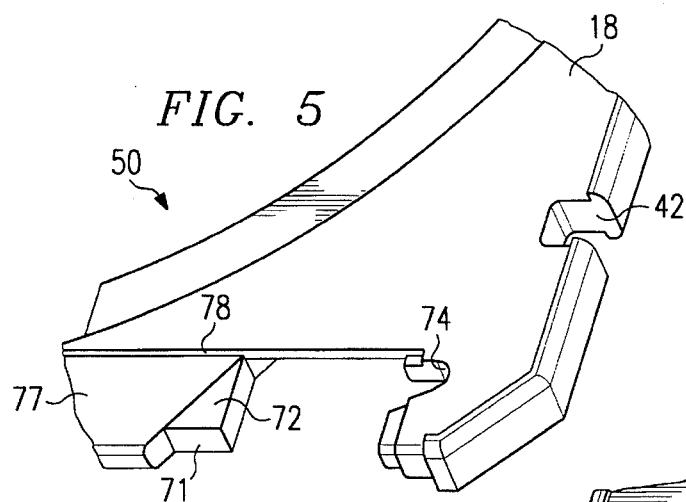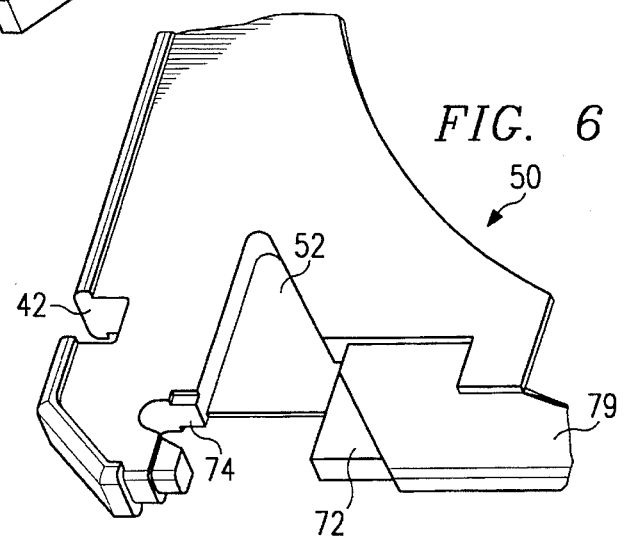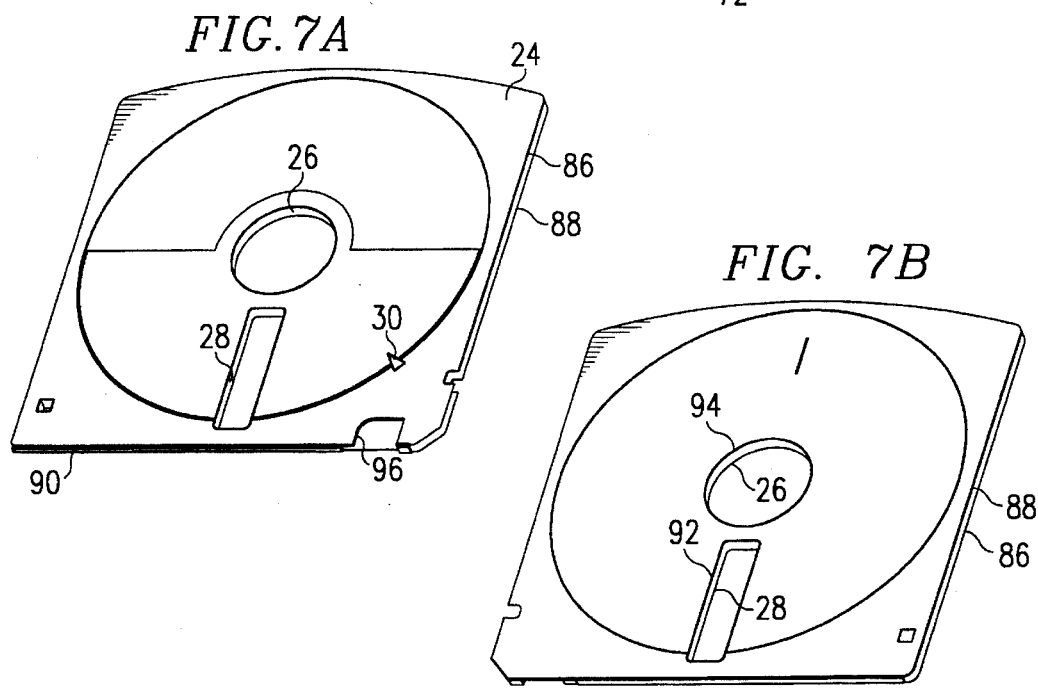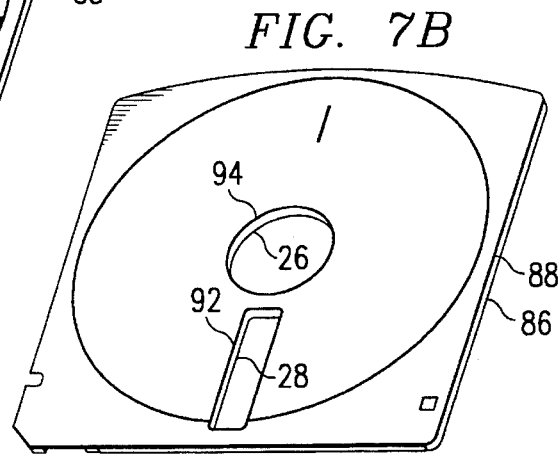

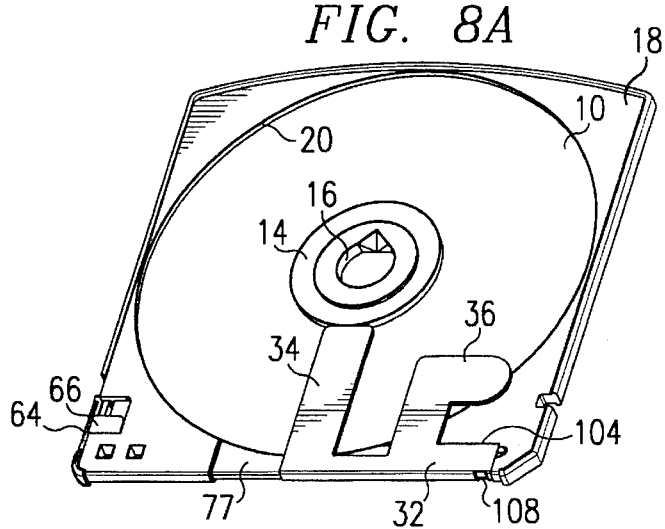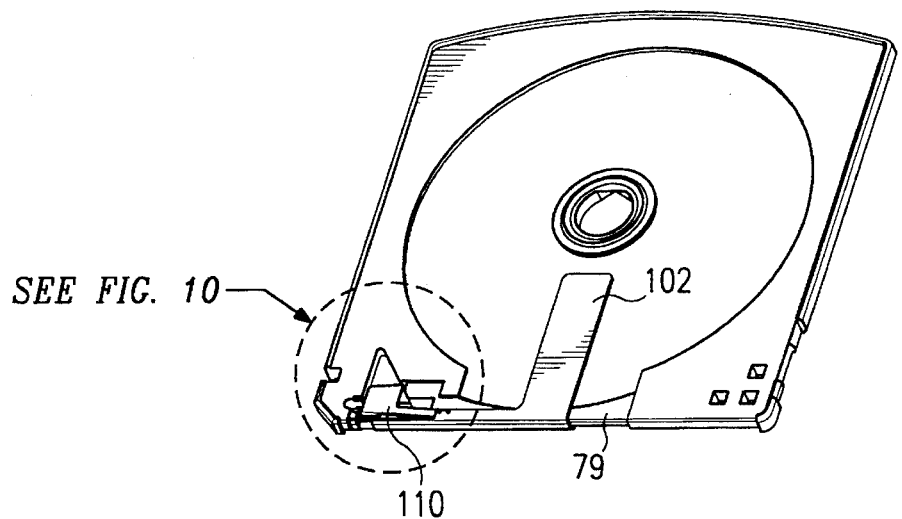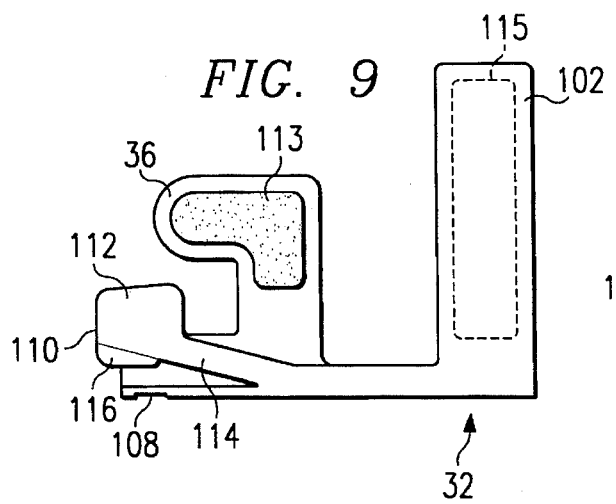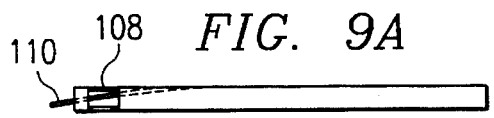

HOLOGRAPHIC STORAGE MEDIA PACKAGE

CROSS REFERENCE TO RELATED APPLICATIONS

This application is related to U.S. patent application Ser. No. 08/260,359, filed Jun. 15, 1994, and entitled "Holographic Storage Media Changer" (Atty. Dkt. No. TAMA-22,585).

TECHNICAL FIELD OF THE INVENTION

The present invention pertains in general to holographic data storage systems, and more particularly, to a disk-based holographic storage media and the associated package therefor.

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D stacks of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

The holographic storage media can be comprised of a photosensitive polymer material that has a plurality of constituents that react when exposed to an appropriate level of illumination. During a data recording operation, a data encoded light beam and a reference light beam are interfered in a specific location on the surface of the holographic storage media to create an interference pattern, which interference pattern represents the Fourier transform of the data encoded on the data encoded light beam. The interference pattern causes differing levels of polymerization within the holographic storage media to "fix" the interference pattern within the storage media. When the constituents required for the polymerization are completely utilized, no further polymerization will result. However, until the constituents are completely utilized or "depleted" the holographic storage media will be light sensitive.

The present holographic data storage systems utilize a single fixed media that is aligned with respect to the Read/Write optics. This will typically require an overall "light tight" packaging system wherein the optics and the holographic storage media are disposed in a single housing light tight enclosure. Once disposed in the housing, data can be recorded onto the storage media until it is completely "saturated". However, care must be taken when removing the storage media or replacing it with another "virgin" storage media to prevent depletion of unused constituents.

SUMMARY OF THE INVENTION

The present invention disclosed and claimed herein comprises a portable holographic storage device. The holographic storage device contains a holographic storage disk that is rotatable about a central hub. The storage disk is fabricated of a holographic storage media which is operable to holographically store data in select locations therein. A package is provided for enclosing the entire storage disk, and the package fabricated from an opaque material. The package is configured to allow the disk to rotate freely therein when the hub is interfaced with an external rotated mechanism. The hub access window is provided to allow access to the hub by the external rotated mechanism. The hub access window is substantially light sealed at least when the disk is not accessed for writing of data thereto or reading of data therefrom. A data window is disposed in the package for allowing access through a select region of the package by an external optical system along the radial axis of the disk. A data window seal is provided for substantially sealing the data window from light when the disk is not accessed through the data window.

In another aspect of the present invention, the holographic storage media is comprised of a photopolymer material having depletable constituents associated therewith. The constituents are depleted during a record operation wherein data is holographically recorded in the material. These constituents can also be depleted whenever extraneous light illuminates the photopolymer material. The photopolymer material is mounted on a substrate which is disposed about the peripheral edge of the hub. The hub is configured such that it extends up through the first and second hub openings on either side of the package, the first and second hub openings comprising the hub access window. The surfaces of the hub proximate to the inner peripheral edges of the first and second hub openings are substantially perpendicular. On the interior surfaces of the inner peripheral edges of the hub openings, the hub has a substantially parallel concentric surface that extends outward from the perpendicular surfaces. This provides a light seal, such that light cannot reflect around the peripheral edge of the hub opening and illuminate the photopolymer material.

In a further aspect of the present invention, the data window seal is comprised of a door that is operable to slide from a first sealing position to a second open position. The first sealing position configures the door such that it completely covers the data window, the data window comprising a slot disposed on either side of the package. In the preferred embodiment, the data window is a slot disposed along the radial axis of the disk, disposed proximate to the radial axis of the disk. A locking mechanism is provided that prevents the door from being moved from the sealing position to the open position without an appropriate locking mechanism.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates an exploded view of the packaging system for packaging the holographic disk;

FIG. 2 illustrates a top view of the assembled package;

FIGS. 3a and 3b illustrate the basic substrate of the package;

FIG. 4 illustrates a detail of the Read/Write indicator;

FIG. 4a illustrates a perspective view of the Read/Write switch;

FIG. 5 illustrates a detail of the door latching portion of the substrate;

FIG. 6 illustrates a detail of the opposite side of the package in the area of the door latching mechanism;

FIGS. 7a and 7b illustrate top and bottom views, respectively, of the outside cover of the package;

FIG. 8a illustrates a perspective view of the basic substrate with the disk and the door disposed therein;

FIG. 8b illustrates a view of the opposite side of the structure of FIG. 8a;

FIG. 9 illustrates a top view of the door mechanism;

FIG. 9a illustrates a side view of the door mechanism;

DETAILED DESCRIPTION OF THE INVENTION

Figure 10:
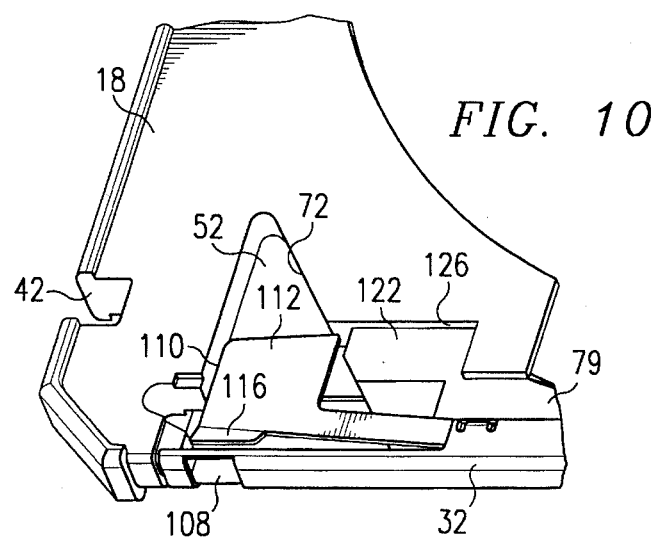
FIG. 10 illustrates a detail of the area associated with the door mechanism.

Referring now to FIG. 1, there is illustrated an exploded view of the basic package for the holographic storage media. A holographic storage media in the form of a disk 10 is provided. The disk 10 is operable to be rotated by a disk stepping drive (not shown) that is operable to selectively position one of a plurality of storage regions 12 within the storage media 10, such that the storage region 12 is disposed at a predetermined radial position relative to the overall package, as will be described hereinbelow. Digital data is converted into an image that is comprised of a plurality of "light areas" and "dark areas" in a predetermined pattern. This image is converted into a Fourier transform and stored in the storage region 12 in the form of an interference grating caused by the interference of a reference beam with an object beam, which object beam has the data image superimposed thereon. Although not described herein, a plurality of interference gratings, referred to as "pages" of data, can be stored in the storage region 12. Each of the storage regions 12 are arranged in a predetermined pattern on the holographic storage media 10 and separated by a predetermined distance. This is described in more detail in U.S. patent application Ser. No. 08/228,114, filed Jun. 15, 1994, entitled "Holographic Data Storage System with Disk-Based Holographic Storage Media" (Arty. Dkt. No. TAMA-22, 537).

The disk 10 is comprised of a substrate fabricated of a high quality optical material, such as glass, which is approximately 900 microns in thickness. A layer of photopolymer material is then disposed on the surface of the substrate to a thickness of approximately 20 microns. The photopolymer material is a material that undergoes photo-induced polymerizations. These compositions have been used to form conventional holograms, and are typically fabricated from a viscous or gelatin-like composition which is photo-reactive. When two laser beams intersect in this composition to set up an interference pattern, this causes selective polymerization within the material. These compositions typically contain a polymeric binder, a liquid ethylinically unsaturated monomer and a photoinitiator system. Typically, the layer of viscous or gelatin-like recording material is spun or web coated onto the substrate such as glass to provide a thin coating. A capping layer of material such as Mylar® is then disposed over the gelatin layer. This provides a relatively good optical surface on the upper surface of the gelatin layer and the glass substrate provides a high quality optical surface on the bottom surface of the gelatin-like recording layer.

When the data and reference beam interfere within the storage region 12 the polymerization caused thereby results in the formation of an interference grating. This represents the Fourier transform of the data image that was superimposed on the data beam, which can be recovered later as a reconstructed data image by again illuminating the area with a reference beam having substantially the same parameters as the reference beam utilized for the original storage of the reference beam grating.

The disk 10 is mounted onto a hub 14 at the center thereof, which hub has a spindle mounting hole 16 disposed in the center thereof. The spindle mounting hole 16 is operable to interface with a spindle on a disk drive stepping motor for rotation of the disk 10.

A substructure 18 is provided for the package which is fabricated from a molded material such as plastic. The substructure 18 has contained therein a receptacle or well 20, which is operable to receive the holographic storage disk 10 with an opening 22 disposed therein such that the well 20 only has a narrow concentric surface to contact the outer peripheral edge of the disk 10. This is merely for the purpose of holding the disk 10 during assembly while allowing optical access to either side of the disk 10 when the disk 10 is fully disposed within the package. A "light tight" cover 24 is provided which cover is comprised of a lower surface and an upper surface that are folded together. The cover 24 is manufactured from a metal material such as aluminum that is relatively thin. The hub access hole 26 is provided for fitting about the hole 16 and interfacing therewith to provide a "light tight" seal, as will be described hereinbelow. A data access slot 28 is provided that is disposed along the radial axis of the disk 10, the slot 28 having a corresponding slot on the opposite side such that recording of data in an accessed one of the storage locations 12 and reading of data therefrom can be achieved when the cover 24 is in place. As will be described hereinbelow, a door is provided for optically sealing the slot 28 when the disk 10 is in a storage position or is being transported. A fiduciary opening 30 is provided which is operable to allow access from one side to the peripheral edge of the disk 10. As will be described hereinbelow, this is for the purpose of determining positional information of the disk 10.

Referring now to FIG. 2, there is illustrated a top view of the assembled package. When the package is fully assembled, a door 32 is provided which has a data opening cover portion 34 and a fiduciary opening cover portion 36 associated therewith, these being described hereinbelow in more detail. The package in FIG. 2 is illustrated in the storage position wherein the door is closed, such that the slot 28 is light sealed and the fiduciary opening 30 is light sealed. A status switch 38 is provided on the upper edge of the package which is operable to block light passage through an opening 40. This is used in conjunction with various external optical detectors to indicate a binary status of the package wherein it can be determined whether the switch 38 is closed or open. This is utilized to provide two informational states about the package. Additionally, along the bottom edge of the package there is provided an indentation 42 which is utilized for registration of the package in a holder, which is not the subject of the present invention. It can therefore be seen that the package in its portable or storage state contains the holographic storage media disk in a light sealed manner, with the door 32 being moveable, as will be described hereinbelow, to allow access to the data stored therein and also to allow access to the disk for writing thereto. As will also be described hereinbelow, in the storage position or in the portable position, the door 32 is "locked".

Referring now to FIGS. 3*a* and 3*b*, there are illustrated a more detailed view of the substructure 18. FIG. 3*a* illustrated a top view of the substructure 18 and FIG. 3*b* illustrates a bottom view of the substructure 18.

There are two areas of interest, an area 48 and an area 50. The area 48 is the area utilized to enclose the switch 38 and the area 50 is the area utilized to enclose the door 32. FIG. 3*b* illustrates the back side of the substructure 18 illustrating a slot 52 in which an external door opening mechanism is inserted. This will be described in more detail hereinbelow.

Referring now to FIG. 4, there is illustrated a detail of the area 48 in the substructure 18. A recess portion 54 is provided for holding the switch 38. The recessed portion 54 has a groove 56 with two indented "dimples" 58 and 60 disposed therein along the length of the groove 56. The recessed portion 54 has an opening or window 62 disposed therein. The opening 62 aligns with the opening 40 in the completed package of FIG. 2.

Referring now to FIG. 4*a*, there is illustrated a detail of the switch 38. The switch 38 has a front tactile surface 64 with a protrusion 66 extending backwards therefrom. The protrusion 66 is operable to be disposed within the recess 54. A raised longitudinal rail 68 is disposed on the surface of the protrusion 66 and extending parallel to the tactile surface 64. A detent 70 is provided at one end of the rail 68. The rail 68 is operable to be disposed in the groove 56 and slide therealong. The detent 70 is operable to be disposed in the dimple 58 or in the dimple 60. Therefore, when the switch 38 is disposed within the recess 58, it can be slidably moved from one direction to the other. The extension 66 can therefore be moved from a position overlapping the window 62 and a position not overlapping the window 62.

Referring now FIG. 5, there is illustrated a topside detail of the area 50. An opening 71 is provided having a slanted surface 72. A recess 74 is provided in the opposite side of the opening adjacent the lower surface of the package and diametrically opposite the sloping surface 72. The recess 74 is operable to receive a gripping member having a detent on the most distal end thereof. Although not described herein, the package is operable to be placed in a slot (not shown) on its edge such that the gripping member can be inserted into the opening 71 and lowered such that the protrusion on the distal end thereof can be placed in the recess 74 to allow the package to be extracted from the slot. A securing groove 78 is disposed within the back surface of the substructure 18 for the purpose of providing a guide for the door 32 and for allowing it to be secured. A recessed area 77 is provided for allowing the door 32 (not shown) to freely move within the package.

Referring now to FIG. 6, there is illustrated a backside view of the area 50. The slot 52 has a portion thereof formed by the sloping surface 72. The slot 52 is shaped such that an angled door opening mechanism can be inserted therein, which angled member has an angled surface substantially conforming to the angle of the sloping surface 72. The operation of this will be described hereinbelow with respect to the door 32 operation. A small recessed area 79 is formed on the outside edge of the package on the reverse side proximate to the sloping 72. This is utilized with respect to a locking member on the door 32, as will be described hereinbelow and also for allowing the door 32 to freely move within the package.

Referring now to FIGS. 7*a* and 7*b*, there are illustrated top and bottom views of the cover 24. The cover 24 is comprised of two surfaces, an upper surface 86 and a lower surface 88. The upper surface 86 and the lower surface 88 are connected together by a front edge surface 90. In general, the cover 24 is fabricated from a single sheet of material that is patterned and folded at the edges thereof. In this manner, the edges of the bottom and top surfaces 88 and 86 diametrically opposite the edge 90 will be open such that they can slide over the substructure 18. The top surface 86 has the hub access opening 26 disposed therein and the data access opening 28. On the rear surface illustrated in FIG. 7*b*, there is a corresponding data access opening 92 and a corresponding hub access opening 94. Therefore, the hub will be exposed and extend outward on both sides of the package and the portion of the disk 10 disposed in the data access openings 28 and 92 will be accessible from both sides of the package. A door opening 96 is provided at the lower end of the edge 90. The edge 90 comprises the leading edge of the package. The door opening 96 allows the external angled member, not shown, to be inserted therein to open the door 32.

Referring now to FIGS. 8*a* and 8*b*, there is illustrated an assembled view of the package without the cover 24. The disk 10 is disposed within the well 20 and the door 32 disposed on the edge of the substructure 18 such that it is operable to slide on one side within the recess 77 on the other side within the recess 79. The door 32 is dimensioned such that it has on one side thereof the first data access door cover 36 and on the other side thereof a data access door cover 102. Additionally, a protrusion provides the fiduciary opening cover 36 for the access opening 30. The lower end of the door 32 has a rail 104 for being disposed within the groove 78. An opening 108 is provided within the edge of the door 32, which opening 108 is operable to receive the angled member for opening and closing the door.

In FIG. 8*b*, there is illustrated a spring actuated locking member 110 on the door 32, which will be described in more detail hereinbelow.

Referring now to FIGS. 9 and 9*a*, there is illustrated a detail of the door 32. The door 32 is fabricated from a single piece of thin gauge aluminum to provide the access door covers 34 and 102 and the fiduciary opening cover 36. The locking member 110 contains an expanded flat surface 112 at the end of a spring-loaded arm 114. An outward extending portion 116 is provided which is disposed proximate the opening 108 in the door 32. The locking member extends downward at a predetermined angle, as illustrated in FIG. 9*a*.

During the operation of the disk 10 within the housing, it is necessary to ensure that not only is the Read/Write head accurately positioned to a predetermined storage location on the surface of the disk 44, but also that all movement is minimized during either a Record operation or a Read operation. One problem that can occur is that due to excess vibration. To minimize any excess vibration, a layer of cloth material is disposed on the interior surfaces of the cover 24. This layer of cloth is illustrated herein with respect to FIG. 11. A similar layer of cloth material is utilized on conventional floppy disks in a wiping function to remove any debris from the surface thereof. In the present application, the material provides a damping effect to remove or minimize vibrations. Additionally, the door 32 has a layer of cloth material 113 disposed on the side of the fiduciary opening cover 36 proximate to the disk 44. A layer of cloth material 115 is disposed on the interior side of the access door cover 102, with a similar layer disposed on the interior surface of the access door cover 34 (not shown). These layers of cloth material are of the type manufactured by Veratec, under the tradename VERATUF SMOOTH. Since the door 32 reciprocates within the package, this constitutes movable structures relative to the disk 44. By preventing or damping any vibrations, this will ensure a higher reliability package.

Referring now to FIG. 10, there is illustrated a detail of the area 50 with the locking member 110 and door 32 in place. The upper edge of the flat portion 112, when bent inward to the slot 52 will contact a stop portion 122 that forms a part of the recess 79. If the door 32 is urged upward, the upper edge of the flat surface 112 will contact the stop portion 122 to prevent the data access opening covers 34 and 102 from opening. When the external angled member is inserted into the opening 108, the angled surface thereof urges the door 32 upward and also contacts the outward extending protrusion 116, thus urging the portion 112 outward such that it will bypass the bottom portion of the stop portion 122 and enter a recess 126 as a portion of the recess 79. It will therefore allow the door 32 to slide upward in the recess 79. The angled member (not shown) when withdrawn from the slot 52 will push downward on the lowest edge of the opening 108, thus positively closing the door 32.

Figure 11:
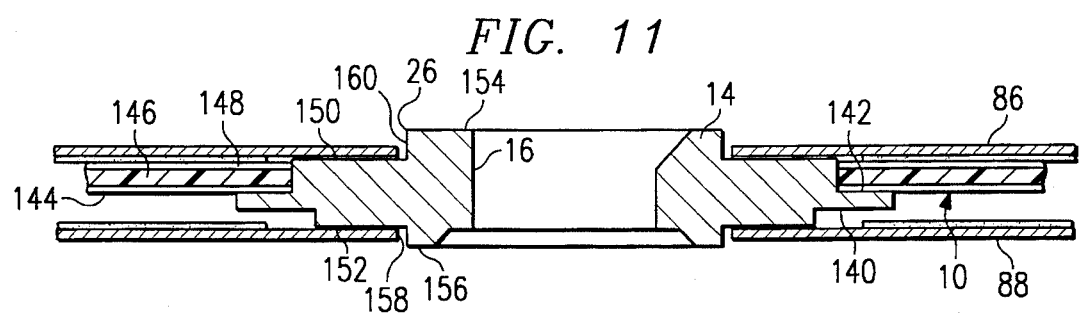
FIG. 11 illustrates a cross-sectional view of the hub.

Referring to FIG. 11, there is illustrated a cross-sectional view of the disk 10 when disposed in the package. The hub 14 has a number of concentric "porches" or surfaces concentrically disposed about the spindle opening 16. The most distal concentric porch is a porch 140 having a support surface 142 for supporting the inner peripheral edge of the holographic storage media disk 10. An appropriate adhesive is provided for attaching the disk 10 to the porch 140. The holographic storage media disk 10, as described above, is fabricated from a glass substrate 144 covered by a layer 146 of photopolymer. A Mylar® capping layer 148 is disposed over the layer 146 of photopolymer.

A second concentric porch 150 on one side of the hub and a similarly disposed porch 152 on the opposite side of the hub 16 are provided for interfacing with the external surfaces 86 and 88 of the package on the inner peripheral edge of the hub access opening 26. The porches 150 and 152 are recessed down into the package relative to an outer surface 54 proximate to the porch 150 and an outer surface 156 proximate to the porch 152. The surface between the porch 152 and the outer surface 156 is a substantially perpendicular surface 158, and the surface between the porch 150 and the outer surface 154 is a substantially perpendicular surface 160. The inner peripheral edge of the surfaces 86 and 88 extend inward proximate both the porch 150 and the porch 152 and the respective perpendicular surfaces 160 and 158. As such, they are "light tight", i.e., light is prevented from passing around the inner peripheral edges of the surfaces 86 and 88 and contaminating the photopolymer layer 146. Neither the surface of the porch 150 nor the perpendicular surface 160 are fabricated from a "polished material" and therefore, light will not be transmitted therearound through reflection. This effectively provides a light seal. Additionally, a layer of cloth material 161 is disposed on the interior surface of the surface 88 and a layer of cloth material 163 is disposed on the interior surface of the surface 86, the function of these material layers 161 and 163 described above with respect to FIGS. 9 and 9a. In general, they provide a damping effect to the disk 44.

Figure 12:
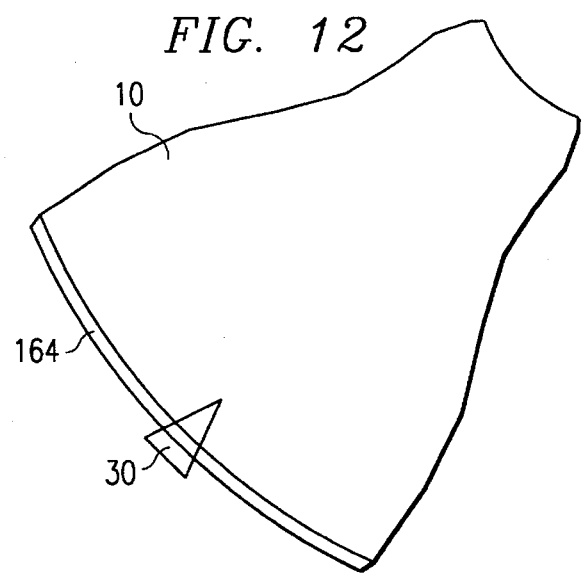
FIG. 12 illustrates a detail of the fiduciary marking system.

Referring now to FIG. 12, there is illustrated a detail of the access opening 30 and the peripheral edge of the disk 10. Disk 10 has disposed on the peripheral edge a peripheral edge region 164 for fiduciary markings. These fiduciary markings are comprised of a grating pattern that encodes an angular position for each grating pattern. They are disposed in 0.9 milliradian increments. Therefore, an optical system can reflect light from the surface of the peripheral region 164 through the access opening 30 to read the information encoded in the grating pattern. This allows for precise angular positioning of the holographic storage disk within the package.

In summary, there has been provided a package for storing a holographic optical disk that allows for storage thereof and also for transportation thereof. The holographic storage disk is fabricated from a photosensitive material that allows holographic data to be optically recorded within select regions of the holographic storage disk. The material from which the holographic storage disk is fabricated has depletable constituents that are required for the polymerization process. These depletable constituents can be "depleted" if subjected to unnecessary illumination. The package is therefore light sealed when stored or moved from location to location. This is facilitated by providing a total enclosure for the holographic storage disk with access to the hub of the disk for rotation thereof and also access to select storage locations on the surface of the disk. The access to select locations on the surface of the disk is provided through a data access opening on both sides of the package, wherein a door is provided for covering both sides of the access opening. A lock is provided which must be actively disengaged to allow the door to be opened. This prevents tampering with the door during storage or transportation.

Although the preferred embodiment has been described in detail, it should be understood that various changes, substitutions and alterations can be made therein without departing from the spirit and scope of the invention as defined by the appended claims.

What is claimed is:

1. A portable holographic storage device, comprising:
    a holographic storage disk rotatable about a central hub and fabricated with a holographic storage media operable to holographically store data at select locations therein;
    a package for enclosing said holographic storage disk and fabricated from an opaque material, and configured to allow said disk to rotate therein;
    a hub access window for allowing access to said hub on said holographic storage disk for interface thereof to an external rotating mechanism, said hub access window substantially light sealed at least when said disk is not accessed for writing of data thereto or reading of data therefrom;
    a data window for allowing access through a select region of said package along the radius of said disk; and
    a data window seal for substantially light sealing said data window when said disk is not accessed through said data window.

2. The storage device of claim 1, wherein said holographic storage media is comprised of a material that has depletable constituents associated therewith, which depletable constituents are depleted during a holographic record operation, and wherein said depletable constituents are depleted when illuminated by light.

3. The storage device of claim 2, wherein said holographic storage media comprises a photopolymer material.

4. The storage device of claim 1, wherein said package is a substantially rigid structure having an upper surface disposed proximate to one surface of said holographic storage disk and a lower surface disposed proximate to the other side of said holographic storage disk, said upper surface having a first hub opening therein and said lower surface having a second hub opening disposed therein, said first and second hub openings comprising said hub access window, and wherein said hub is operable to extend partially outward from said first and second hub openings and wherein said hub has a first perpendicular surface disposed substantially perpendicular and proximate to the peripheral edge of said first hub opening and a second perpendicular surface disposed substantially perpendicular and proximate to the peripheral edge of said second hub opening, with a first concentric surface disposed proximate to the interior surface of said upper surface and extending outward from said first perpendicular surface and a second concentric surface disposed proximate to the interior surface of said lower surface and extending outward from said second perpendicular surface such that a light seal is provided around said first and second hub openings proximate to the peripheral edge of said first and second hub openings.

5. The storage device of claim 4, and further comprising a layer of damping material disposed on at least the interior of said upper surface of or said lower surface proximate to said holographic storage disk for providing a damping effect within said package.

6. The storage device of claim 1, wherein said data window comprises a substantially longitudinal slot disposed parallel to the radial axis of said disk and fixed relative to said disk.

7. The storage device of claim 1, wherein said data window seal comprises a reciprocating cover for being moved from a first position to a second position, in said first position, said cover being disposed between said data window and the surface of said disk and, in said second position, for being moved away from said data window to allow access to said disk.

8. The storage device of claim 7, and further comprising a layer of damping material dispose on the surface of said reciprocating cover proximate to said holographic storage disk for damping or preventing any vibrations.

9. The storage device of claim 1, and further comprising a plurality of fiduciary marks disposed on the peripheral edge of said disk and a fiduciary access window disposed within said package to allow optical access to said fiduciary marks on the peripheral edge of said holographic storage disk and a fiduciary access seal for selectively sealing said fiduciary access window.

10. The storage device of claim 9, wherein said fiduciary access seal operates in conjunction with said data window seal such that when said data window seal substantially light seals said data window, said fiduciary access seal substantially seals said fiduciary access opening.

11. The storage device of claim 1, and further comprising a locking mechanism for preventing said data window seal from allowing access to said data window without a proper unlocking mechanism.

* * * * *